United States Patent
Heist et al.

(10) Patent No.: US 10,302,421 B2
(45) Date of Patent: May 28, 2019

(54) METHOD AND DEVICE FOR THE CONTACT-FREE MEASUREMENT OF SURFACE CONTOURS

(71) Applicant: Fraunhofer-Gesellschaft zur Foerderung de angewandten Forschung e.V., Munich (DE)

(72) Inventors: Stefan Heist, Jena (DE); Peter Kühmstedt, Jena (DE); Gunther Notni, Jena (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 49 days.

(21) Appl. No.: 14/912,080

(22) PCT Filed: Aug. 13, 2014

(86) PCT No.: PCT/EP2014/067371
§ 371 (c)(1),
(2) Date: Feb. 12, 2016

(87) PCT Pub. No.: WO2015/022384
PCT Pub. Date: Feb. 19, 2015

(65) Prior Publication Data
US 2016/0202051 A1    Jul. 14, 2016

(30) Foreign Application Priority Data

Aug. 14, 2013   (DE) .................. 10 2013 013 791

(51) Int. Cl.
*G01B 11/25*    (2006.01)
*G03B 21/20*    (2006.01)
*G03B 37/04*    (2006.01)

(52) U.S. Cl.
CPC ...... *G01B 11/2513* (2013.01); *G01B 11/2545* (2013.01); *G03B 21/2033* (2013.01); *G03B 37/04* (2013.01)

(58) Field of Classification Search
CPC ............ G01B 11/2513; G01B 11/2545; G03B 21/2033; G03B 37/04
(Continued)

(56) References Cited

U.S. PATENT DOCUMENTS

| | | | |
|---|---|---|---|
| 2009/0169095 A1* | 7/2009 | Zhuang .............. | G01B 11/2545 382/154 |
| 2010/0008588 A1 | 1/2010 | Feldkhun et al. | |
| 2013/0120532 A1* | 5/2013 | Milch .................... | A61C 9/006 348/45 |

FOREIGN PATENT DOCUMENTS

| | | |
|---|---|---|
| DE | 10321883 A1 | 12/2004 |
| DE | 102009024894 A1 | 12/2010 |

(Continued)

OTHER PUBLICATIONS

International Preliminary Report on Patentability issued in PCT/EP2014/067371, with English translation, dated Feb. 16, 2016, 15 pages.

(Continued)

*Primary Examiner* — Tri T Ton
(74) *Attorney, Agent, or Firm* — Faegre Baker Daniels LLP (57) ABSTRACT

Method and device for non-contact measuring of surface contours. A sequence of stripe patterns, formed from a plurality of stripes of equal stripe direction are projected on a surface to be measured, wherein the stripe patterns are each aperiodic and have a sinusoidal brightness distribution and wherein, during the projecting of each of the stripe patterns, at least one image of the surface is captured by at least one camera. By the stripe pattern projected on the (Continued)

surface, corresponding points in the image planes of a camera and of a projection device used for projecting, or in the image planes of the cameras, are then identified by maximizing a correlation between sequences of brightness values recorded for each of the points, whereupon spatial coordinates of surface points on the surface are determined via triangulation on the basis of points identified as corresponding.

12 Claims, 5 Drawing Sheets

(58) Field of Classification Search
USPC ..... 356/600–613, 237.1–237.6, 239.1–239.8
See application file for complete search history.

(56) References Cited

FOREIGN PATENT DOCUMENTS

| DE | 102009056177 A1 | 6/2011 |
|---|---|---|
| WO | 2010136329 A1 | 12/2010 |
| WO | 2015022384 A1 | 2/2015 |

OTHER PUBLICATIONS

Brauer-Burchardt, C., et. al. On the Accuracy of Point Correspondence Methods in Three-Dimensional Measurement Systems Using Fringe Projection. Optical Engineering, 52(6): 063601-1-063601-11, Jun. 2013.
Heist, S., et. al. Array Projection of Aperiodic Sinusoidal Fringes for High-Speed Three-Dimensional Shape Measurement. Optical Engineering, 53(11):112208-1-112208-12, Nov. 2014.
Heist, S., et. al. High-Speed 3D Shape Measurement Using Array Projection. Proc. of SPIE, 8788:878815-1-878815-11, 2013.
Honegger, M. et. al. Scanning Fringe Projection for Fast 3D Inspection. Proc. of SPIE, 8788:878814-1-878814-11, 2013.
International Search Report and Written Opinion issued in PCT/EP2014/067371, dated Nov. 12, 2014, 19 pages.
Zuo, C., et. al. High-Speed Three-Dimensional Shape Measurement for Dynamic Scenes Using Bi-Frequency Tripolar Pulse-Width-Modulation Fringe Projection. Optics and Lasers in Engineering 51:953-960, 2013.
Wissmann, Patrick; et al. "Fast and Accurate 3D Scanning Using Coded Phase Shifting and High Speed Pattern Projection." 2011 International Conference on 3D Imaging, Modeling, Processing, Visualization and Transmission, IEEE Computer Society, pp. 108-115.

* cited by examiner

METHOD AND DEVICE FOR THE CONTACT-FREE MEASUREMENT OF SURFACE CONTOURS

CROSS-REFERENCE TO RELATED APPLICATIONS

This application is a national phase application of PCT Application No. PCT/EP2014/067371, internationally filed Aug. 13, 2014, which claims priority to German Application 10 2013 013 791.8, filed Aug. 14, 2013, all of which are herein incorporated by reference in their entirety.

TECHNICAL FIELD

The disclosure relates to a method for the contact-free measurement of three-dimensional surface contours, as well as to a device for the contact-free measurement of three dimensional surface contours, with which device the method can be carried out.

BACKGROUND

In a generic method, a sequence of strip patterns of the same strip direction which are formed in each case from a multitude of strips is projected by way of a projecting device onto a surface to be measured, wherein in each case at least one picture of the surface is taken by a camera or by each of at least two cameras, during the projection of each of the strip patterns. Corresponding points in picture planes of the camera and of the projection device or in picture planes of the cameras are then identified by way of the strip pattern projected onto the surface, whereupon spatial coordinates of surface points on the surface are determined by triangulation on the basis of the points identified as corresponding.

Such methods e.g. are known from the documents DE 10 2007 022 361 A1 and DE 10 2006 049 695 A1. Sometimes, such methods envisage some of the projected strip patterns being phase-shifted strip patterns with a sinusoidal brightness course, which permit a phase value to be assigned to each point on the surface, whilst some further ones of the projected strip patterns define a grey code, which permits the resolution of ambiguity which still remains after determining the phase values.

A difficulty which results with such triangulation methods which are based on pattern projection lies in a comparatively large number of patterns having to be projected and accordingly many pictures having to be taken, so that the corresponding or homologous points in the picture planes can be identified unambiguously and sufficiently accurately, which of course cannot be effected in an infinitely short time. For this reason, the measurement of surface contours with the methods of this type which are known from the state of the art demands a comparatively long measurement duration. This is disadvantageous for many applications, in particular if moved surfaces are to be measured or if a hand-held apparatus is to be used for this.

SUMMARY

The present disclosure describes a method for an as accurate as possible, contact-free measurement of three-dimensional surfaces which makes do with comparatively short measuring times. Also, the disclosure describes a corresponding device which permits a contact-free measurement of a surface contour with a high accuracy and thereby extremely short measuring times.

A sequence of brightness values is detected for each of the points, on the basis of which the triangulation is to take place, by way of taking (recording) the pictures during the projecting of the strip patterns. A quasi static sequence of brightness values results on each surface point due to the fact that the projected strip patterns, although now each having a sinusoidal brightness course in the environment of each of the strips, however are each aperiodic, wherein this sequence turns out to be different to the extent that it can be differentiated, even for slightly distanced surfaces points. By way of this, it is possible to identify the corresponding points with a high accuracy by way of maximizing a correlation between sequences of brightness values which are detected for each of the points, and this can be effected in a comparatively rapid manner. This detail concerning the rapidity first and foremost relates to the measuring time which is given by the number of camera recordings, and not necessarily to the evaluation time, since e.g. the phase values can often be computed more quickly than the correlation between the picture points of the camera.

In embodiments in which two cameras are used for recording the pictures, and one triangulates on the basis of the corresponding points in the picture planes of these cameras, it is not even necessary to precisely know the projected strip pattern. However, a triangulation on the basis in each case of a point in the picture plane of a single camera and of a point which corresponds thereto which is to say of a homologous point—both terms are used synonymously herein—in the picture plane of the projection device, is also possible, since a characteristic sequence of brightness values also results in the latter for each point, by way of the sequence of strip patterns.

A device for the contact-free measurement of three-dimensional surface contours of the suggested type which comprises a projection device for projecting strip patterns into an object space, a camera or at least two cameras for taking pictures of a surface in the object space and which is to be measured, and a control and evaluation unit for activating the projection device and the camera or cameras and for evaluating the picture taken therewith, and which is suitable for carrying out the described method, is also accordingly advantageous. The control and evaluation unit of this device, according to embodiments of the disclosure, is configured, to activate the projection device for projecting a sequence of strip patterns of the same strip direction which are formed in each case from a multitude of strips, to activate the camera or each of the cameras for taking in each case at least one picture of the surface during the projection of each of the strip patterns, to identify corresponding points in picture planes of the camera and of the projection device or in picture planes of the at least two cameras, by way of the projected strip patterns by way of maximizing a correlation between sequences of brightness values which are detected for each of the points, and to determine spatial coordinates of surface points on the surface by way of triangulation on the basis of the points which are identified as corresponding, wherein the projection device is configured to project the strip patterns in each case as aperiodic strip patterns which in an environment of each of the strips have a brightness course which is sinusoidal in each case.

The "maximization of a correlation between sequences of brightness values which are detected for each of the points"—with the described method, as with the configuration of the control and evaluation unit of the corresponding device is to be understood as follows:

On taking in each case at least one picture of the surface with the camera or with each of the at least two cameras, in each case a sequence of brightness values is detected for a multitude of points in the picture planes of the camera and of the projection device or in picture planes of the cameras. Now, for each point in a first of the two picture planes, the point corresponding thereto, which is to say the homologous point in the other picture plane is identified by way of a multitude of potentially corresponding points in the other picture plane being compared to the mentioned point in the first picture plane by way of evaluating (or applying) a correlation function for (to, respectively) the pairs of sequences of brightness values, which have been detected for the points to be compared. The point which corresponds to the first-mentioned point is then identified as that point amongst the potentially corresponding points, for which the correlation function assumes a maximum or, at all events an extreme. Thereby, it is sufficient if only those points in the other picture plane which each lie on an epipolar line corresponding to the respective point in the first picture plane, are taken into consideration as potentially corresponding points.

The correlation function can be infinitely selected within large limits and needs only display the characteristic which is typical for the correlation functions, specifically, given an identity of the sequences compared by way of the evaluation of the correlation function, of assuming an extreme—typically a maximum—and of approaching this extreme, the more similar these compared sequences are. If with regard to this extreme, on account of the correlation function, it is the case of a minimum, then the locating of this minimum is to be understood as a maximizing in the context of embodiments of the disclosure.

It is to be expressly pointed out that additionally also projecting a sequence of strip patterns with a different strip direction, for example with a strip direction which is perpendicular to the strip direction of the mentioned strip patterns, is also not to be ruled out. As the case may be, such an additional sequence can be projected after the first mentioned sequence of strip patterns or in a manner temporally interleaved with this. The projecting of strip patterns of a different strip direction however is not necessary, at least when one makes use of the epipolar geometry in a manner described further hereinafter, which renders the identification of the corresponding points a one-dimensional problem.

The demanded aperiodicity of the strip patterns can be given by way of an amplitude and/or spatial frequency of the individual strip patterns and/or a phase shift between the different strip patterns not being constant. As to how many consecutive strip patterns are actually required, in order to unambiguously identify the corresponding points with an adequate reliability, is thereby dependent on the surface nature of the surface to be measured. The number of strip patterns which are projected and evaluated for a measurement can be varied depending on this. The number of strip patterns is selected for the sequence of strip patterns can also depend on the ratio of the periodicity/spatial frequency of the patterns and the camera resolution, on the desired spatial resolution in the measuring volume and/or on surrounding conditions, e.g. interference light. This number can finally also be selected depending on whether an as short as possible measurement duration or the reliable avoidance of ambiguities for an as accurate as possible measurement is more important with a given situation.

It is also possible for a measurement, in each case to use a certain number of directly consecutive strip patterns from a longer sequence of continuously changing strip patterns, by way of the suggested type of the strip patterns and their evaluation for identifying corresponding or homologous points. Thus in each case only a detail from the sequence of strip patterns is used for the measurement, wherein this detail can continually move along with the sequence of continuously projected strip patterns in the manner of a sliding window. Advantageously, the individual measurement can thereby be carried out with all necessary evaluation steps, without for this, having to firstly wait for the projection of a very specific sequence of strip patterns.

Thus the surface to be measured can be detected in a continuous manner, by way of changing strip patterns being continuously projected by the projection device onto the surface, wherein the mentioned sequence of strip patterns, which is used for identifying corresponding points, is formed in each case by a subset of these projected strip patterns which consists of a defined number of directly consecutive strip patterns. Accordingly, the control and evaluation device, for the continuous detection of the surface, can be configured to activate the projection device for projecting continuously changing strip patterns and to form the mentioned sequence of strip patterns which is used for identifying corresponding points, in each case by way of a subset of these projected strip patterns which consists of a defined number of directly consecutive strip patterns.

The step of identifying the corresponding points can be simplified by way of the correlation which is to be maximized being determined in each case only for points on corresponding epipolar lines in the picture planes. Thereby, one utilises the fact that with a given geometry of the applied device, for each point in one of the picture planes, only points on an epipolar line which is defined by the geometry and is in the respective other picture plane are considered at all candidates for the corresponding or homologous point in this other picture plane. It is accordingly advantageous if this control and evaluation unit of the suggested device, for identifying the corresponding points, is configured to determine the correlation to be maximized, in each case only for points on corresponding epipolar lines in the picture planes. The geometry of the device or the orientation of the strip patterns should thereby be usefully selected such that the strip direction and a direction of the epipolar lines enclose an as large as possible angle, in the best case a right angle.

It is particularly advantageous if the projection device comprises a multitude of projectors in each case with at least one individual light source, of which each is configured for projecting one of the strip patterns in each case. The strip patterns then, specifically on projecting the sequence, can be changed by way of simply switching between the light sources of the different projectors, thus by way of the light source of the projector or of each of the projectors, which project the current strip pattern, being switched off in each case, whilst the light source of the projector or each of the projectors which are envisaged for projecting the next strip pattern being switched on. The control and evaluation unit can be configured for the purpose of activating the projection device by way of switching between the light sources of the different projectors for changing the strip patterns when projecting the sequence of strip patterns. It is therefore possible to project the different strip patterns by way of different projectors which are contained in the projection device and are each with at least one individual light source, wherein the strip patterns can be changed on projecting the sequence, by way of switching between the light sources of the different projectors. The sequence of strip patterns with a given number of strip patterns can be projected in a particularly short time by way of this, since a switching between the light sources of the different projectors is possible significantly more quickly than a picture change in a single projector. The picture change which is necessary for projecting the sequence of strip patterns can therefore be carried out more quickly in the suggested manner, by which means the measurement time which is required for the measurement of the surface can be drastically reduced. Thereby, it is indeed possible to realize picture exchange rates of a magnitude of 100 kHz, depending on the type of the light source. The rapid picture change in turn also renders it possible to use a sequence of relatively many strip patterns in each case, and this renders the method more stable, particularly with complicated surface geometries. A comparatively long pattern sequence, within which the object is "quasistatic", can therefore also be projected with moved objects by way of the suggested type of projection.

With regard to the light sources, it can each be the case e.g. of one or more LEDs or of one or more laser diodes, which permit a particularly rapid switching-on and switching-off and thus a particularly rapid projection of the sequence of strip patterns.

Embodiments envisage the projectors being arranged in several rows or columns which are orientated parallel to the strip direction, wherein in each case several of the projectors are configured for projecting each of the strip patterns and wherein the projectors which are configured for projecting in each case one of the strip patterns are arranged in each case in one of the rows or columns or in directly adjacent rows or columns. The projectors with the embodiment can be arranged e.g. in a matrix-like manner. If with such an arrangement, each of the strip patterns is projected with several of the projectors in each case, wherein the projectors which are used for projecting one of the strip patterns in each case are selected from one of the rows or columns or off from directly adjacent rows or columns, then specifically there is the advantage that each of the strip patterns can be projected more brightly onto the surface to be measured, so that a much greater illumination intensity is realised on the surface than with the use of only a single projector in each case. Thereby, a worsening of the picture quality is advantageously avoided on account of the orientation of the rows or columns of projectors parallel to the strip direction, since there is no blurring of the strip patterns perpendicular to the strip direction, wherein this blurring would reduce the quality. Even if the individual projectors were not in the position of projecting exactly sinusoidal brightness courses, a locally sinusoidal brightness course can be realised with this embodiment for example by way of the projectors which are used for the projection of one of the strip patterns in each case, projecting strips of slightly different width—given the same position of the strips—thus by way of a sampling of binary patterns of different strip widths of the individual projectors or micro-projectors. The production of locally sinusoidally brightness courses is also possible by way of slight "misfocussing" of the (micro-) projectors, i.e. by way of the projection (micro-) lens not being arranged exactly in the focal plane of the condenser (micro-) lens.

Embodiments described in the above paragraph permit the projection of adequately bright strip patterns and thereby the selection of light sources of the projectors first and foremost with regard to an as rapid as possible switching ability. LEDs which can be switched on an off in an extremely rapid manner can therefore be used, in particular in the case of an arrangement of the described type, despite the limit illumination intensity, and this permits a very rapid change between the strip patterns. The projection device can also be designed in an extremely flat and thus compact manner by way of this.

In embodiments, —even if this is also not necessarily the case—the projectors will be transmitted light projectors and each comprise at least one projection unit with a condenser lens, with a fixed imaging medium for producing the respective strip pattern and with an objective lens. This permits the projection units, if required to be realised on a common transparent substrate, by which means a particularly compact construction results. Under certain circumstances, it can be advantageous if each of the projectors in each case comprises several projection units which are illuminated by the same light source. The individual projection units can then be designed in a particularly small manner which permits an even more compact construction.

BRIEF DESCRIPTION OF THE DRAWINGS

Embodiments are hereafter explained by way of FIGS. 1 to 5. There are shown in

DETAILED DESCRIPTION

Figure 1:
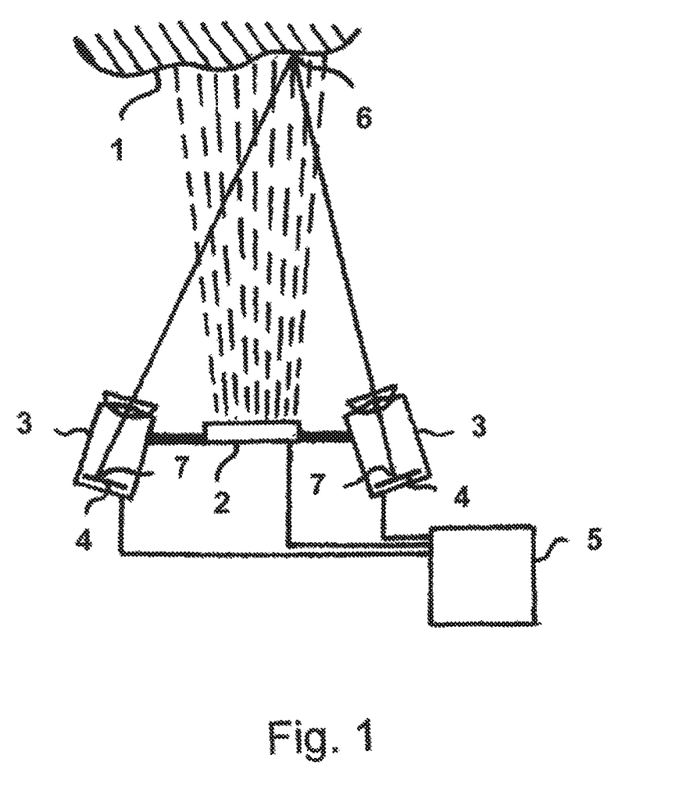
FIG. 1 in a schematic representation, a plan view of a device for the contact-free measurement of three-dimensional surface contours, according to embodiments of the disclosure.

A device which is suitable for the contact-free measurement of three-dimensional surface contours is shown in FIG. 1. A test body with a surface 1 to be measured is represented by way of example in an object space in front of this device. The device comprises a projection device 2 for projecting strip patterns into the object space, as well as two cameras 3 which are arranged symmetrically thereto, for taking pictures of the surface 1. Each of these cameras has a picture sensor 4 which is arranged in a picture plane of the respective camera 3. Finally, the device also comprises a control and evaluation unit 5 for activating the projection device 2 and the cameras 3, and for evaluating the pictures which are taken by these. The cameras 3 and the projection device 2 are fixedly connected to one another and therefore have a fixed and known arrangement and orientation relative to one another. An inner geometry of the device which is known by way of this, permits a contact-free measurement of the surface 1 by way of a triangulation method which is described in more detail hereinafter The projection device 2 is firstly activated by way of the suitably configured control and evaluation unit 5 such that it projects a sequence of different strip patterns of the same strip direction which are formed in each case from a multitude of strips, onto the surface 2. The strips are thereby orientated perpendicularly to the plane of the drawing and as a result are perpendicular to epipolar lines which are defined by the geometry of the device in the picture planes of the two cameras 3 which are spanned by the picture sensors 4. With regard to the strip patterns, it is thereby the case of aperiodic strip patterns in each case, which have a brightness course which is sinusoidal in each case in an environment of each of the strips, wherein an aperiodicity of these strip patterns results due the fact that that an amplitude and/or a spatial frequency of the individual strip patterns and/or a phase shift between the different strip patterns is not selected in a constant manner, but in contrast changes in a continuous or also non-constant manner in a direction perpendicular to the strips—thus from strip to strip. The cameras 3 are activated by the control and evaluation unit 5 such that each of these cameras 3 in each case takes a picture of the surface 1 during the projection of each of the strip patterns. Thus, a sequence of pictures is taken in each case with each of the cameras 3, of which pictures each is to be assigned to one of the strip patterns, specifically to the strip pattern which is currently projected during the taking of the respective picture.

Corresponding or homologous points in the picture planes of the two cameras 3 are then identified by way of evaluating the recorded pictures by way of the suitably programmed control and evaluation unit 5, and specifically by way of the strip patterns which are projected onto the surface 1. Homologous or corresponding is thereby to be understood as those points in the picture planes of the two cameras 3, onto which a same surface point of the surface 1 is imaged. This is represented in FIG. 1 by way of example for a selected surface point 6 which is imaged onto the two corresponding points 7. For identifying the corresponding points, one thereby makes use of the fact that a sequence of brightness values which is found again in the sequence of pictures recorded by the respective camera and which is detected for each of the points by way of this, results for each point in the picture planes of each of the cameras 3 with the sequence of projected strip patterns.

These sequences of brightness values are quasi static and differ from surface point to surface point, in particular at least perpendicularly to the strip direction, due to the aperiodic nature of the strip patterns. Utilizing this, the corresponding points are then identified in each case by way of maximizing a correlation which is formed between the sequences of brightness values which are detected for the potentially corresponding points. For this, a correlation function—freely selectable within a large range—is evaluated for a multitude of pairs of brightness value sequences and the result of this evaluation—specifically a correlation value which is determined for each pair of compared points by way of this—is maximized for locating the pairs of corresponding or homologous points. The correlation to be maximized and the correlation function are thereby formed and evaluated respectively, thereby in each case only for points on corresponding epipolar lines, whilst applying epipolar geometry. Thus for each point in the picture plane of a first of the two cameras 3, one seeks the corresponding point only on a corresponding epipolar line in the picture plane of the remaining camera 3. The corresponding points can thereby be found with a spatial resolution which is greater than a picture resolution which is defined by a pixel matrix of the picture sensors 4, since brightness valves and accordingly sequences of brightness values, by way of interpolation, can also be formed for points which do not exactly correspond to a pixel position.

Spatial coordinates of the surface points of the surface 1 are now determined by the control and evaluation unit 5 by way of triangulation, on the basis of the points in the picture planes of the camera 3, said points thus being defined as corresponding, and this can be effected by way of applying simple trigonometric relations due to the known geometry of the device.

With a modification of embodiments of the disclosure, one can triangulise also on the basis of points, which in each case correspond, on the one hand in a picture plane of a single camera and on the other hand in a picture plane of the projection device 2 which is spanned by an imaging medium, instead of the described triangulation of the basis of corresponding points in the picture planes of two cameras 3. The corresponding points in this case are analogously identified in the picture plane of the then single camera 3 and in the picture plane of the projection device 2. For this, one proceeds in just the same manner, wherein the sequences of brightness values which in this case form the basis for the points in the picture plane of the projection device 2, in each case result directly from the projected strip patterns which are assumed to be known.

Figure 2:
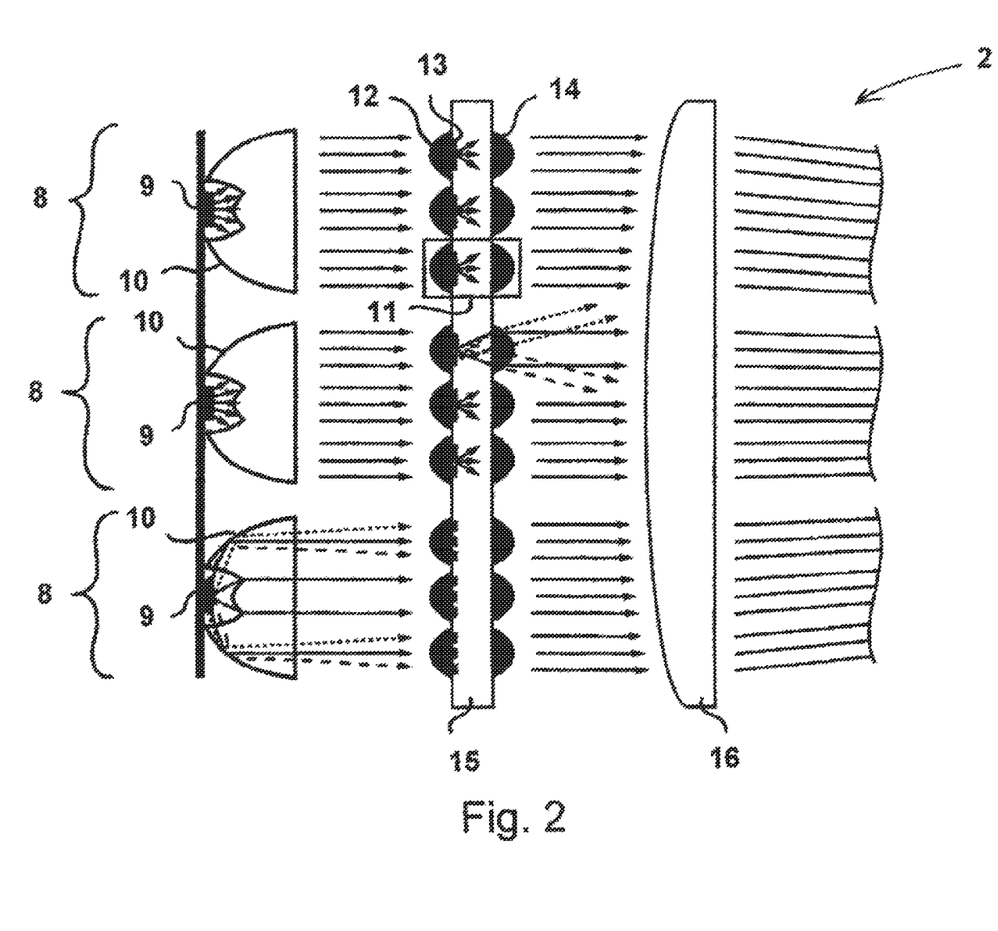
FIG. 2 a detail of a cross section through a projection device, which is a constituent of the device of FIG. 1, according to embodiments of the disclosure.

A part of the projection device 2 is shown in FIG. 2 in the form of a cross section. The projection device 2 comprises a multitude of individual projectors 8 which are arranged in the shape of a matrix and each comprise an individual light source 9. With regard to the light sources 9, it is the case of particularly rapidly switchable LEDs. Of course other light sources, for example laser diodes, can also be used instead of LEDs, with modifications of the described device. A concave concentrator 10 is provided for each of the light sources 9, with regard to an as good as possible usage of the radiation power of the light sources 9 and for avoiding interfering influences upon adjacent projectors 8. In embodiments, each of the projectors 8 for its part comprises several projection units 11 which are illuminated by the same light source 9 and of which one is represented in a boxed manner in FIG. 1, and which each comprise a condenser lens 12, a fixed imaging medium 13 for producing one of the strip patterns in each case and an objective lens 14.

With regard to the projectors 8, in embodiments, it is thus the case of special transmitted light projectors, wherein the imaging media 13 of these transmitted light projectors can e.g. be manufactured lithographically. Thereby, each of the projectors 8 by way of the fixed imaging media 13 is configured to project in each case exactly one of the strip patterns of the projected sequence of strip patterns. In embodiments, all projection units 11 are realised on a common, transparent substrate 15, with which it is the case of a glass wafer which on a side which faces the light sources 9 carries the imaging media 13 and the condenser lenses 12 and on an opposite side carries the objective lenses 14. Finally, the projection device 2 yet comprises a macroscopic lens 16 which serves for beam correction and spans all projection units 11.

Due to the fact that several of the projection units 11 in each case belong to the same projector 8 and in particular are used for projecting the same strip pattern in each case, a good picture quality of the strip patterns which are commonly projected in each case by the projection units 11 can be achieved by way of slight differences between the imaging media 13 of the projections units 11 of the same projector 8, for example by way of slightly different strip widths. In particular, by way of this, one can also realise a locally, in each case at least quasi sinusoidal brightness course, even if the individual imaging media 13 are only suitable for reproducing two or a very limited number of grey tones in each case.

The changing between the different strip patterns of the projected sequence of strip patterns, with the projection device 2 which is described herein is effected by way of switching between the light sources 9 of the different projectors 8. A very high picture change rate of up to about 100 kHz can be realised by way of this, so that the sequence of strip patterns which is required for measuring the surface 1 as a whole can be projected in a relatively short time, and accordingly the pictures to be evaluated can also be taken in a very short time.

Figure 3:
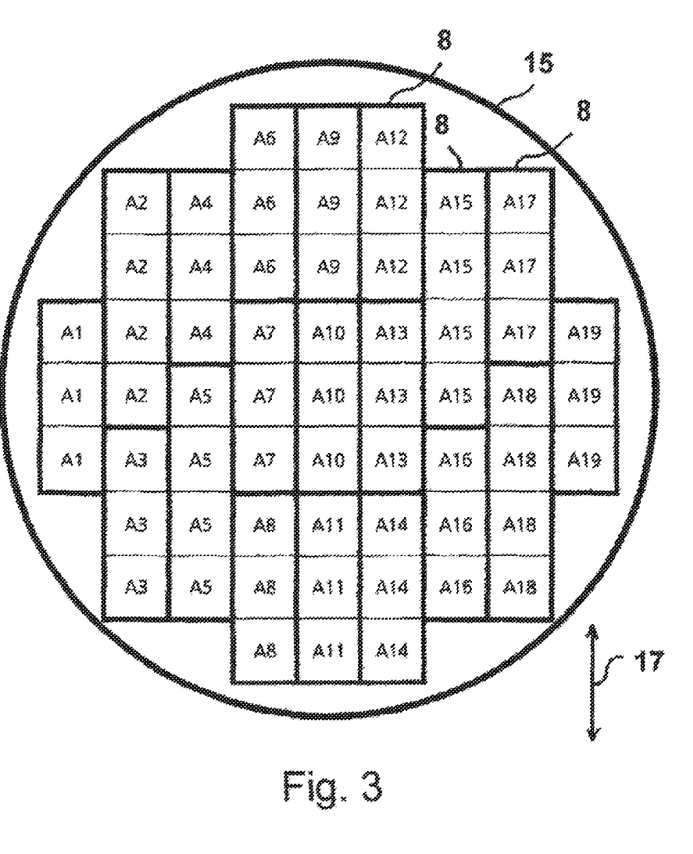
FIG. 3 a view onto a matrix of projectors which is contained in the mentioned projection device, according to embodiments of the disclosure.

A plan view of the substrate 15 is represented in FIG. 3, in which view a matrix formed by the projectors 8 is to be recognised. The individual projectors 8 are thereby illustrated in each case only by a square. The strip direction of the strip patterns which are projected by the projectors 8 is illustrated in FIG. 3 by a double arrow 17. As is to be recognised in FIG. 3, the projectors 8 are arranged in several columns which are orientated parallel to the strip direction. Thereby, each of the strip patterns is projected in each case with several of the projectors 8, wherein the projectors 8 which are used for projecting one of the strip patterns in each case is selected from one of the columns in each case. Incidentally, with a modification, also instead of this or additionally, in each case several projectors 8 from in each case one or directly adjacent rows of the matrix can be used for projecting strip patterns with a strip direction which is orientated parallel to the rows. It would also be possible to select the projectors 8 which are used for projecting one of the strip patterns in each case, from two directly adjacent columns. In embodiments, with regard to the projected strip patterns, it is the case of in total nineteen different strip patterns A1 to A19 which are successively projected by way of switching between the light sources 8, wherein a distribution of the strip patterns which are numbered according to the sequence of the projection 8, onto the projectors 8 and which is selected here is illustrated by way of the projectors 8 each being provided with the reference of the strip pattern A1 to A19 projected by the respective projector 8. Each of the strip patterns A1 to A19 is accordingly projected in each case by three or four of the projectors 8, whose three or four light sources 9 can be simultaneously switched on and off for this purpose.

Of course, it is possible to continuously project the nineteen strip patterns A1 to A19 by way of a suitable switching on and off of the light sources in a cyclical sequence. The surface 1 which under certain circumstances changes with time, way of a suitable configuration of the control and evaluation unit 5 with regard to programming technology, can then be continuously detected and measured by way of in each case the lastly projected strip patterns—and specifically in each case a defined number of strip patterns which can also be smaller than twenty—being used as a current sequence of strip patterns in the context of the previously described method. The mentioned number can thereby be selected smaller or larger depending on the demands placed upon the speed of the measurement or stability and accuracy of the method, under certain circumstances also depending on a surface characteristic of the surface 1.

Figure 4:
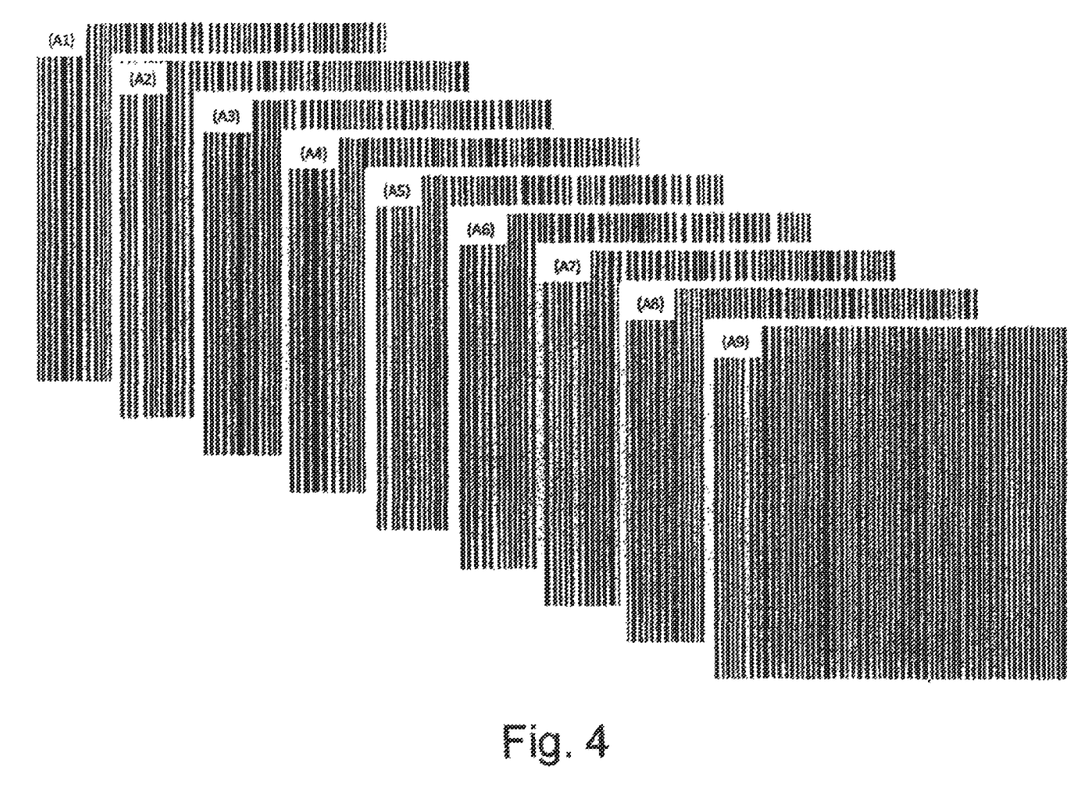
FIG. 4 an illustration of a sequence of strip patterns, which are projected with the mentioned projection device, when a surface is measured in a contact-free manner with the device of FIG. 1, according to embodiments of the disclosure.
Figure 5:
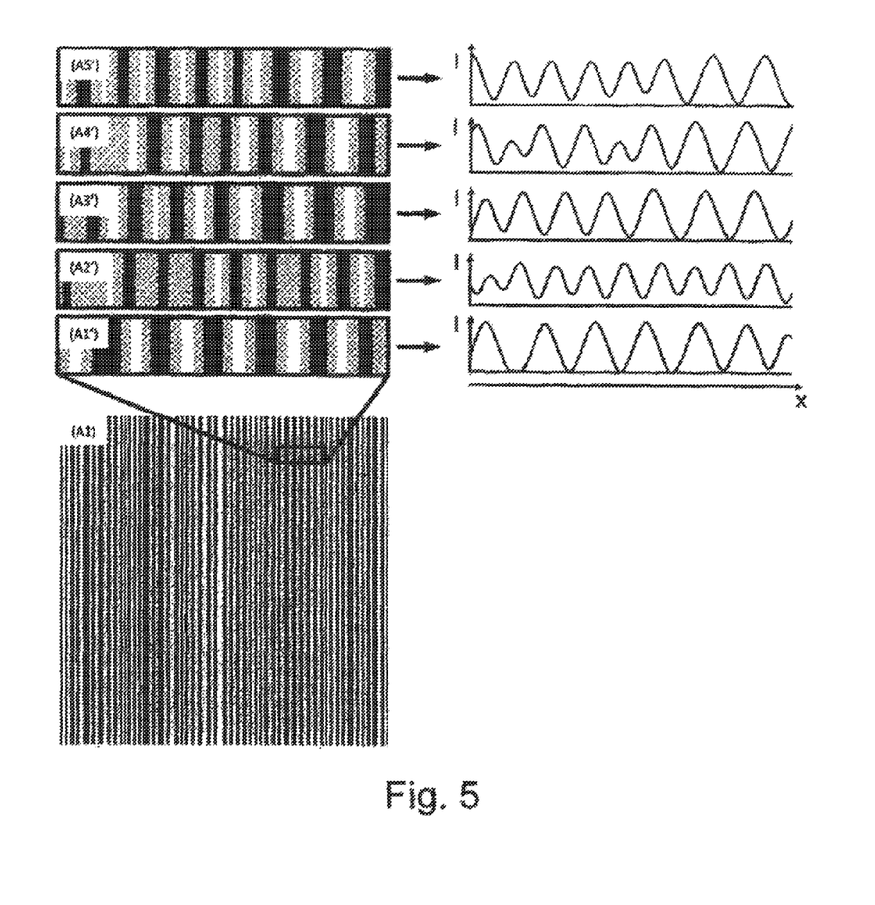
FIG. 5 in a diagrammatic representation, with the example of five details of the strip patterns, a brightness course of these strip patterns, according to embodiments of the disclosure.

Nine of the strip patterns, specifically the strip patterns A1 to A9 are represented in FIG. 4 for illustrating a possible sequence of strip patterns which is suitable for the described method. This representation permits the recognition of the character of the strip patterns A1 to A9 which is aperiodic in the context described above, as well as their brightness course which is locally sinusoidal in each case. FIG. 5 in a diagrammatic representation shows the outlined aperiodicity of the strip patterns by way of five different details A1' to A5' of the strip patterns A1 to A5 selected merely by way of example. Thereby, it is shown as to how the respective detail A1' is selected, for the strip pattern A1 which is represented once again by way of example. A diagram is represented for each of the five details in FIG. 5, and this diagram in each case shows a brightness value I of the respective detail A1' to A5' of one of the strip patterns A1 to A5 in dependence on a spatial coordinate x, wherein the spatial coordinate x in each case specifies a location on a coordinate axis orientated perpendicularly to the strip direction. As can be well recognised in FIG. 5, the strip patterns A1 to A5 already in the shown small details A1' to A5', although having a locally sinusoidal brightness course, however do not have a constant amplitude, spatial frequency and relative phase position.

The invention claimed is:

1. A method for contact-free measurement of surface contours, comprising:
   projecting a sequence of strip patterns of an equal strip direction which are formed in each case from a multitude of strips, onto a surface to be measured, by way of a projection device;
   taking, in each case, at least one picture of the surface by one of a camera and each of at least two cameras, during the projecting of each of the strip patterns;
   identifying corresponding points in one of picture planes of the camera and of the projection device and picture planes of the at least two cameras, by means of the strip patterns which are projected onto the surface; and
   determining spatial coordinates of surface points on the surface by triangulation on the basis of the points identified as being corresponding,
   wherein the strip patterns are each aperiodic and in an environment of each of the strips have a brightness course which is sinusoidal, wherein the different strip patterns are projected by way of different projectors which are contained in the projection device, each of the projectors having at least one individual light source and comprising several projection units which are illuminated by the same individual light source, each of the projection units having a condenser lens, an objective lens, and a fixed imaging medium for producing the respective strip pattern, wherein, when projecting the sequence of strip patterns, the strip patterns are changed by way of switching between the light sources of the different projectors, and wherein the corresponding points are identified by way of maximizing a correlation between sequences of brightness values which are detected for each of the points.

2. The method of claim 1, wherein at least one of an amplitude and spatial frequency of the individual strip patterns and a phase shift between the different strip patterns is not constant.

3. The method of claim 1, wherein the projectors are arranged in several rows or columns which are orientated parallel to the strip direction, wherein each of the strip patterns is projected in each case with several of the projectors, wherein the projectors which are used for projecting in each case one of the strip patterns are selected in each case from one of the row or columns or from directly adjacent rows or columns.

4. The method of claim 1, wherein continuously changing strip patterns are projected by the projection device onto the surface, for the continuous detection of the surface, wherein the mentioned sequence of strip patterns which is used for identifying the corresponding points is formed in each case by a subset of these projected strip patterns which consists of a defined number of directly consecutive strip patterns.

5. The method of claim 1, wherein the correlation to be maximized is determined in each case only for points on corresponding epipolar lines in the picture planes, for identifying the corresponding points.

6. A device for contact-free measurement of three-dimensional surface contours, comprising a projection device for projecting strip patterns into an object space, at least one camera for taking pictures of a surface to be measured and in the object space, and a control and evaluation unit for activating the projection device and the at least one camera and for evaluating the pictures which are taken, wherein the control and evaluation device is configured to:
  activate the projection device for projecting a sequence of strip patterns of an equal strip direction which are formed in each case from a multitude of strips;
  activate the at least one camera for taking in each case at least one picture of the surface during the projection of each of the strip patterns;
  identify corresponding points in picture planes of the at least one camera by means of the projected strip patterns; and
  determine spatial coordinates of surface points on the surface by way of triangulation on the basis of the points which are identified as being corresponding,
  wherein the projection device is configured to project the strip patterns in each case as aperiodic strip patterns which in an environment of each of the strips have a brightness course which is sinusoidal, wherein the projection device comprises a multitude of projectors, each of the projectors being configured for projecting one of the strip patterns, having at least one individual light source and comprising several projection units which are illuminated by the same individual light source, each of the projection units having a condenser lens, an objective lens, and a fixed imaging medium for producing the respective strip pattern, and wherein the control and evaluation unit is configured to activate the projection device by way of switching between the light sources of the different projectors for changing the strip patterns when projecting the sequence of strip patterns and to identify the corresponding points by way of maximizing a correlation between sequences of brightness values which are detected for each of the points.

7. The device of claim 6, wherein at least one of an amplitude and spatial frequency of the individual strip patterns and a phase shift between the different strip patterns is not constant.

8. The device of claim 6, wherein the projectors are arranged in several rows or columns which are orientated parallel to the strip direction, wherein in each case several of the projectors are configured for projecting each of the strip patterns, wherein the projectors which are configured to project one of the strip patterns are arranged in each case in one of the rows or columns or in directly adjacent rows or columns.

9. The device of claim 6, characterised in that the projection units are implemented on a common transparent substrate.

10. The device of claim 6, wherein the light sources are given in each case by one or more LEDs or laser diodes.

11. The device of claim 6, wherein the control and evaluation unit, for the continuous detection of the surface, is configured to activate the projection device for projecting continuously changing strip patterns, and to form the mentioned sequence of strip patterns which is used for identifying corresponding points, in each case by way of a subset of these projected strip patterns which consists of a defined number of directly consecutive strip patterns.

12. The device of claim 6, wherein the control and evaluation unit, for identifying the corresponding points, is configured to determine the correlation to be maximized, in each case only for points on corresponding epipolar lines in the picture planes.

* * * * *